March 27, 1934.   H. A. AFFEL   1,952,524
TRANSMISSION REGULATOR CIRCUITS
Filed Oct. 7, 1932

INVENTOR
H. A. Affel
BY
ATTORNEY

Patented Mar. 27, 1934

1,952,524

UNITED STATES PATENT OFFICE 1,952,524

TRANSMISSION REGULATOR CIRCUITS

Herman A. Affel, Ridgewood, N. J., assignor to American Telephone and Telegraph Company, a corporation of New York Application October 7, 1932, Serial No. 636,748

5 Claims. (Cl. 178—44)

This invention relates to transmission circuits, and more particularly to the regulation of transmission circuits. Its purpose is to provide suitable means for compensating for changes in the gain or loss experienced by signal currents flowing in such circuits. Another purpose of the invention is to accomplish this without the need of any mechanical moving parts, and still another purpose is to accomplish this by means of an E. M. F. derived from a pilot wire and associated apparatus, which E. M. F. operates directly on an amplifier of a special type to give a very simple overall circuit and mode of operation thereof.

In general, the transmission equivalent of a circuit is not constant but varies due to a number of causes. Frequently one cause is considerably more important than the others. For example, in cable circuits the chief cause of variation of transmission equivalent is the effect of temperature on the conductivity of the conductors. To compensate for this effect it is common practice to choose a typical cable pair, commonly called a pilot pair or a pilot wire, and include it in the arm of a self-balancing Wheatstone bridge arrangement. Since the other elements of the bridge arrangement can be made substantially constant, the bridge setting is determined by the resistance of the cable pair and therefore may be used to control those circuits which suffer the same changes as the pilot pair.

The device for translating the bridge setting into the adjustment of the circuit to be controlled is usually partly electrical and partly mechanical, for example, as disclosed in patent to Clark No. 1,438,219, December 12, 1922. Such a system involves the use of changing contacts with certain accompanying troubles, and in this invention, among other things, I disclose a pilot wire gain control system in which no such changing contacts are necessary, but in which an E. M. F. derived from the pilot wire and associated apparatus may be applied directly to some part of the transmission system such as the grid of an amplifying tube to change the gain of amplifiers in accordance with changes in the transmission equivalent of the pilot wire. Such circuits have been already disclosed in patents to Dutton, 1,849,141, March 15, 1932 and Corderman, 1,871,-959, August 16, 1932 and the broad conception does not constitute a part of my invention.

Figure 1:
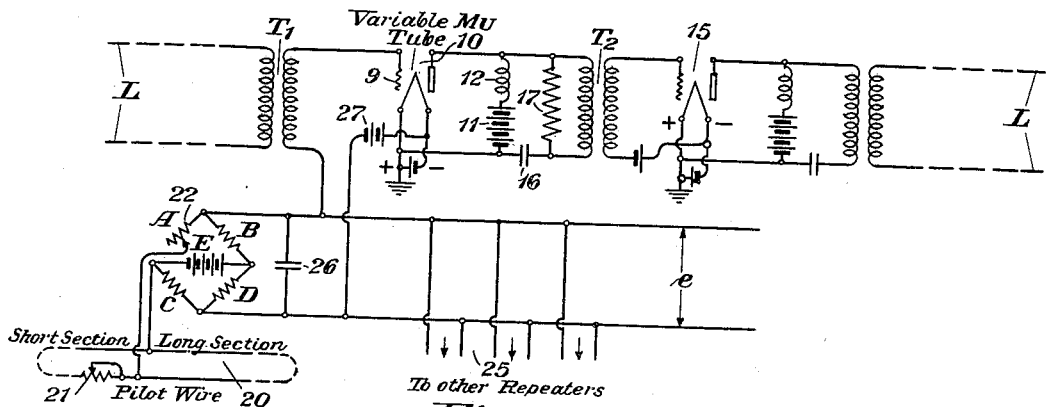
Figure 2:
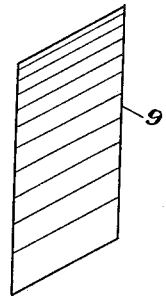
Figure 3:
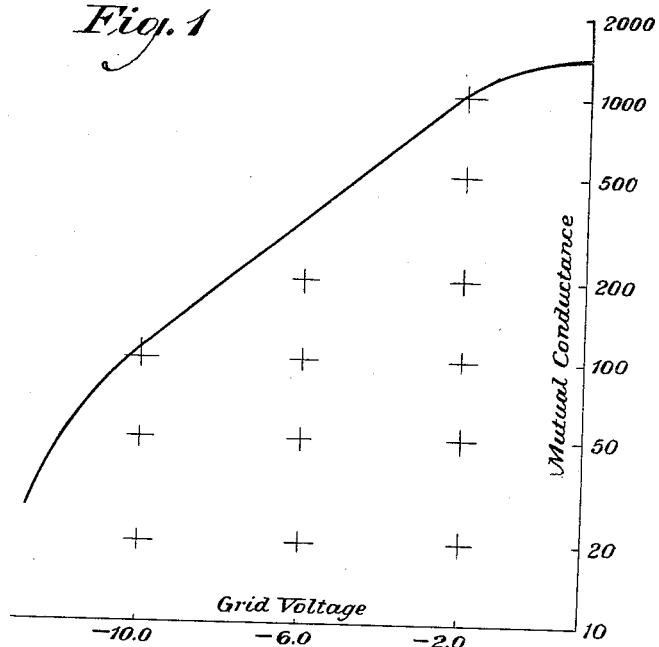
Figure 4:
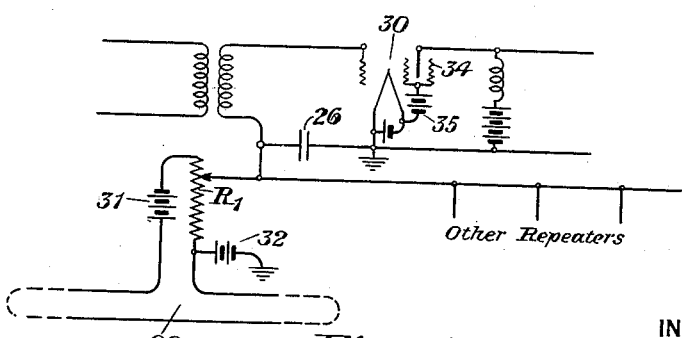

The invention will be better understood by reference to the following specification and accompanying drawing in which Figure 1 shows a circuit arrangement making use of my invention. Fig. 2 is a detail of an element in one of the amplifier tubes of Fig. 1. Fig. 3 is a curve showing some of the characteristics of the tubes used in my invention, and Fig. 4 is a modification of the circuit of Fig. 1.

Referring more specifically to Fig. 1, there is shown an incoming transmisson line L which through a transformer $T_1$ is associated with the grid circuit of the amplifier or repeater tube 10. The output of this tube is supplied with power from battery 11 through a choke coil 12, and the amplified A. C. output is delivered to the primary of the transformer $T_2$. The secondary of this latter transformer then leads to one or more stages of amplification as indicated by the tube 15, and from there continues to the transmission line L. Connected in series with the primary of the transformer $T_2$ is a condenser 16 to prevent the flow of direct current, and in parallel to the primary is a resistance 17 of suitable value which might be employed if necessary to bring the load impedance of the tube 10 to a desired value.

The tube 10 is of a special construction known as the variable mu tube, in this case consisting of the usual three elements, one of which is the grid 9. This grid is shown in greater detail in Fig. 2 and is peculiar in that the spacing of the grid wires varies in a definite way. Thus, in Fig. 2 the spacing between the wires becomes greater as one passes from top to bottom of the grid, and such a construction yields a tube the amplification factor of which depends on the grid bias. Such tubes are now well known in the art, and the method described herein is only one of several by which it is possible to obtain tubes of variable amplification factor. The manner in which this factor varies with grid bias is determined to a considerable extent by the design of the grid, its position with respect to the other elements of the tube, and the circuit with which it is associated. In particular, such a tube may be designed so that over a wide range the change in the logarithm of the mutual conductance is directly proportional to the change in grid bias, and it is such a tube which I contemplate using to carry out my invention. It is represented by the reference character 10 in Fig. 1. For a given tube the associated circuit has a marked influence on the overall characteristic, and I find that by making the load impedance 17 sufficiently small the change in gain is more readily made proportional to the change in the amplification factor or more accurately, the mutual conductance of the tube 5.

From what has been stated above, it is apparent that the amplification obtained at such a repeater station as shown in Fig. 1, may be controlled by the bias given to the grid 9, and in this invention I propose to control such bias by means of an E. M. F. which is derived from a pilot wire circuit. Such a pilot wire is shown in the figure at 20, and in one form of my invention consists of two sections extending from the control point to the ends of the section to be controlled. These two sections are connected in parallel, the resistance of the shorter being built out to the resistance of the longer by means of the variable resistance 21. The pilot wires are placed in arm A of a Wheatstone bridge and are built out by means of a variable resistance 22 in that arm to the resistance of the longest section of the transmission line which is to be controlled. Arms B, C and D are resistances of value equal to the resistance of the pilot wire arm at average temperature. A battery E is placed across one diagonal, and the potential drop across the other diagonal runs directly to the control grid circuit of the variable mu tube. Similar connections are made to any and all other repeaters which are to be controlled by the pilot wire as shown at 25. The connection is such that when the pilot resistance increases the grid becomes more positive. A condenser 26 is shunted across the bridge to prevent the flow of alternating current through the resistances. A supplemental biasing battery 27 is also associated with the grid 9 of the tube 10. It is seen that when the resistance of the pilot wire is such that the bridge is balanced the only biasing voltage on the grid is that due to the battery 27 which is given such a value as to yield the desired gain at average temperatures through the amplifiers 10, 15, etc.

When the resistance of the pilot shifts because of temperature change the bridge will no longer be balanced and there would be a potential difference E which will be applied to the grid circuit of the variable mu tube causing the control grid bias to shift from its normal operating point, thus causing a shift in the gain of the tube.

My invention is based on the fact that for practical purposes it can be assumed that a given number of ohms change in the resistance of the conductors due to temperature, corresponds to a given change in transmission loss regardless of the length of the section in which the change occurs. Such loss may be expressed in terms of any unit, the one which I find convenient for reference being the decibel, where the decibel loss in a circuit is defined by the relation $$db = 10 \log \frac{W_1}{W_2} = 20 \log \frac{I_1}{I_2}$$

Where $db$ represents the decibels loss, $W_1$ and $W_2$ are the energy at the input and the output of the circuit under consideration and $I_1$ and $I_2$ are the currents at the input and output terminals thereof. It is a fact also that expressed logarithmically, i. e., in decibels, the variation in loss of a cable circuit is practically directly proportional to the resistance of the conductor, which in turn varies directly with the absolute temperature.

It will be apparent that if the bridge is balanced for average temperatures then with departure from that temperature the unbalance voltage $e$, over a considerable range, is directly proportional to the change in resistance in the pilot wire. If, now, the design of the tube 10 is in accordance with the specifications given above, the change in gain of the tube 10 is directly proportional to the change in resistance of the pilot wire. By giving the battery E a proper value the unbalanced voltage $e$ of the bridge may be brought to such a value that an increase in the loss of the pilot wire and of the associated transmission lines as measured in decibels, is just equal to the increase in gain of the tube 10, also expressed in decibels. Thus, for any of the signaling channels a loss in transmission level due to change in resistance is just compensated for by an increase in the gain of the tube 10.

That such an arrangement is feasible is shown in Fig. 3, giving the characteristics of a tube of the type described. The potentials of the grid are plotted as abscissæ and the mutual conductance values in micromhos are plotted on a logarithmic scale as ordinates. Over a considerable range it will be observed that there is a straight line relationship and it is over this portion of the characteristic that it is my intention to operate. It will be noted in this figure that a change of grid bias from −2 to −10 volts alters the mutual conductance from approximately 110 to 1030. Since the signaling current which flows in the plate circuit is proportional to the mutual conductance, it will be seen that such a change of grid bias changes the current by a factor of approximately 9.5 which in turn corresponds to a change in gain of approximately 19.5 decibels. As stated above, the voltage of the battery E would, in this particular case, be adjusted to such a value that an increase in the transmission loss of 19.5 decibels in the pilot wire would bring about an increase in the voltage $e$ of 8 volts. It will be observed that this illustration is an extreme one used to show the wide range over which a tube of this type will operate, and at the same time to illustrate the simplicity of the arrangement of my pilot control system in that there is a simple direct proportionality throughout the whole circuit from the pilot wire to the output of the tube 10.

While I have described my invention particularly in terms of the circuit of Fig. 1, it is to be understood that various modifications may be made therein. This is illustrated, for example, in Fig. 4 in which a similar tube 30 of variable mu is used but the biasing voltage as controlled by the pilot channel is obtained in a somewhat different manner. In this case the pilot wire 20 is connected in series with a resistance $R_1$ and the battery 31. The current flowing through the pilot channel will depend upon its resistance, and the changes in voltage across the resistance $R_1$ will, over a considerable range, be directly proportional to the change in resistance of the pilot wires. This change in voltage is then applied to the grid of the tube 30 to control it in the same manner as described in connection with Fig. 1. A biasing battery 32 is also provided to bring the tube to the normal operating position. As a further modification, the tube specifically described in connection with Fig. 1 may be replaced by other types of tube which have a variable mu, especially where the logarithm of the change in mutual conductance is proportional to the change in the grid voltage over the operating range. By proper design such tubes may be obtained in the form of the so-called screen grid tube which I have shown specifically at 30 in Fig. 4, this tube having as an additional element, the screen grid 34 held at any desired potential by the battery 35.

While this description has been confined largely to the tube 10 and its directly associated circuits, it is to be understood that the gain of this tube is only a portion of the total gain of the repeater station. That is, the total required gain of the repeater in excess of that supplied by the variable mu tube is provided by additional vacuum tubes operated without the control feature described in connection with the variable mu tube.

What is claimed is:

1. In a transmission line a pilot wire gain control system in which the change in gain is substantially proportional to the change in ohmic resistance of the pilot wire, a circuit connected to the pilot wire and adapted to deliver an E. M. F. which varies according to the change in resistance of the pilot wire, an amplifier associated with the transmission line the amplifier having a change in mutual conductance whose logarithm is proportional to the change in grid bias, and means for applying to the grid thereof as bias the E. M. F. delivered by the aforesaid circuit.

2. In a transmission line a pilot wire gain control system in which the change in gain is proportional to the change in ohmic resistance of the pilot wire, a circuit connected to the pilot wire and adapted to deliver an E. M. F. which varies proportionately to the change in resistance of the pilot wire, a variable mu tube amplifier associated with the transmission line the amplifier having a change in mutual conductance whose logarithm is proportional to the change in grid bias, and means for applying to the grid thereof as bias the E. M. F. delivered by the aforesaid circuit.

3. In a transmission line a pilot wire gain control system in which the change in gain is substantially proportional to the change in ohmic resistance of the pilot wire, a circuit connected to the pilot wire and adapted to deliver an E. M. F. which varies proportionately to the change in resistance of the pilot wire, a vacuum tube amplifier associated with the transmission line the amplifier having a change in gain proportional to change in grid bias, and means for applying to the grid thereof as bias the E. M. F. delivered by the aforesaid circuit.

4. In a transmission line a pilot wire gain control system in which the change in gain is proportional to the change in ohmic resistance of the pilot wire, a Wheatstone bridge with the pilot wire as one arm, the bridge being balanced for an average temperature and giving an unbalanced bridged voltage proportional to the resistance change in the pilot wire, a variable mu tube amplifier associated with the transmission line the amplifier having a change in mutual conductance whose logarithm is proportional to the change in grid bias, and means for applying to the grid thereof as bias the unbalanced bridge voltage.

5. In a transmission line, a pilot wire gain and loss control system, a circuit connected to the pilot wire and adapted to deliver an E. M. F. which varies in accordance with the change in resistance of the pilot wire, a variable impedance associated with the transmission line, the impedance having a change in conductance whose logarithm is substantially proportional to an applied E. M. F., and means for applying to said impedance the E. M. F. delivered by the aforesaid circuit.

HERMAN A. AFFEL.